United States Patent
Tomokiyo (10) Patent No.: US 7,853,219 B2
(45) Date of Patent: Dec. 14, 2010

(54) DOPPLER FREQUENCY DETECTOR, DOPPLER FREQUECNY ESTIMATING METHOD, AND RECORDING MEDIUM RECORDED WITH A PROGRAM FOR ALLOWING A COMPUTER TO EXECUTE THE METHOD

(75) Inventor: Ryo Tomokiyo, Tokyo (JP)

(73) Assignee: NEC Corporation, Tokyo (JP)

( * ) Notice: Subject to any disclaimer, the term of this patent is extended or adjusted under 35 U.S.C. 154(b) by 1216 days.

(21) Appl. No.: 11/453,925

(22) Filed: Jun. 16, 2006

(65) Prior Publication Data

US 2006/0293072 A1 Dec. 28, 2006

(30) Foreign Application Priority Data

Jun. 23, 2005 (JP) ............................. 2005-183508

(51) Int. Cl.
*H04B 17/00* (2006.01)
(52) U.S. Cl. .................. 455/67.16; 455/67.11; 455/423; 375/344; 375/347
(58) Field of Classification Search ................ 455/67.1, 455/67.11, 67.16, 343.1, 423, 504; 375/344, 375/347
See application file for complete search history.

(56) References Cited

U.S. PATENT DOCUMENTS 6,850,505 B1 * 2/2005 Ostberg ...................... 370/335

7,164,737 B2 * 1/2007 Han ........................... 375/344

FOREIGN PATENT DOCUMENTS

| JP | 2001-24727 | 1/2001 |
|---|---|---|
| JP | 2003-508969 | 3/2003 |
| JP | 2003-198426 | 7/2003 |
| JP | 2004-15819 | 1/2004 |

* cited by examiner

*Primary Examiner*—Tuan H Nguyen
(74) *Attorney, Agent, or Firm*—McGinn IP Law Group, PLLC (57) ABSTRACT

Disclosed is a Doppler frequency detector for detecting a Doppler frequency of a received signal. The detector includes a channel estimating unit, a channel phase variation amount calculating unit, a Doppler frequency estimating unit and a calculation interval calculating unit. The channel estimating unit calculates a channel estimate based on a pilot signal in the received signal. The channel phase variation amount calculating unit calculates channel phase variation amount based on the channel estimate and a calculation interval. The Doppler frequency estimating unit estimates the Doppler frequency based on the channel phase variation amount and outputs a Doppler frequency estimate. The calculation interval calculating unit calculates the calculation interval based on the Doppler frequency estimate and supplies the calculated calculation interval to the channel phase variation amount calculating unit.

24 Claims, 8 Drawing Sheets

DOPPLER FREQUENCY DETECTOR, DOPPLER FREQUECNY ESTIMATING METHOD, AND RECORDING MEDIUM RECORDED WITH A PROGRAM FOR ALLOWING A COMPUTER TO EXECUTE THE METHOD

BACKGROUND OF THE INVENTION

1. Field of the Invention

The present invention relates to a technique of estimating a Doppler frequency for a mobile station in a mobile communication system.

2. Description of the Related Art

In a mobile communication system, a base station has a reception filter such as an Infinite-duration Impulse Response (IIR) filter. The base station uses the reception filter to extract only desired components from a signal received from a mobile station to demodulate the extracted components, which improves the demodulation characteristic at the base station. Moreover, the base station estimates a Doppler frequency of the received signal to control a filter coefficient of the reception filter based on the estimated Doppler frequency, thereby improving reception quality.

JP2003-198426 A (hereinafter, referred to as Document 1) proposes the following method to improve a throughput of the mobile communication system. According to this method, a base station estimates a Doppler frequency of a signal received from a mobile station. Then, the base station varies, in accordance with the estimated Doppler frequency, a multilevel number of a modulated signal to be transmitted to the mobile station.

As described above, in the mobile communication system, it becomes important to estimate the Doppler frequency for the mobile station with high accuracy.

For estimation of the Doppler frequency, JP 2003-508969 A (hereinafter, referred to as Document 2) describes the following technique. According to the technique described in Document 2, a base station obtains a channel estimate from a received signal for each slot. Then, the base station obtains the amount of change of the channel estimate as the phase variation amount of the channel, by using an inner product or a differential vector of the channel estimates. The base station estimates the Doppler frequency based on the phase variation amount.

Figure 1:
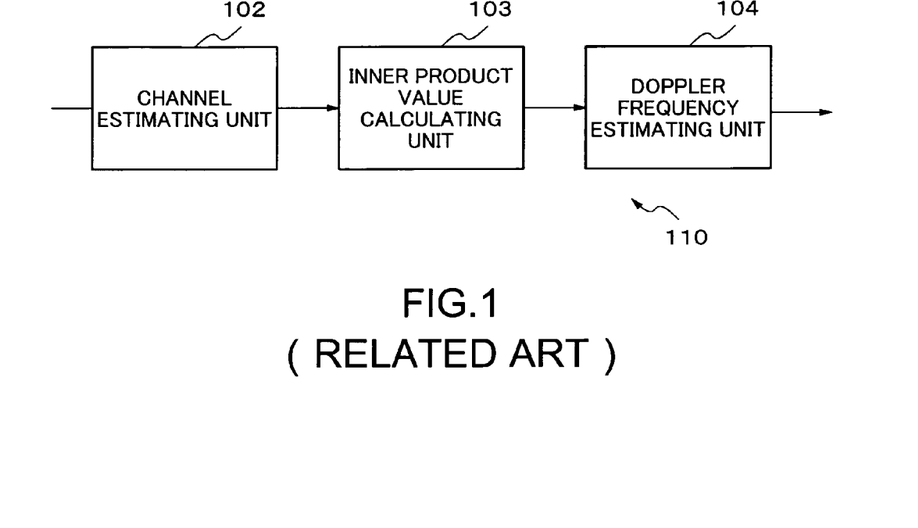
FIG. 1 is a block diagram for explaining a first related art of the present invention.

FIG. 1 is a block diagram showing a configuration of a Doppler frequency detector for estimating a Doppler frequency based on a channel estimate.

The Doppler frequency detector shown in FIG. 1 consists a channel estimating unit 102, an inner product value calculating unit 103, and a Doppler frequency estimating unit 104. The channel estimating unit 102 estimates a channel based on a pilot signal received from a mobile station (not shown). After normalizing the channel estimate, the channel estimating unit 102 outputs the normalized channel estimate. The inner product value calculating unit 103 calculates the phase variation amount in the channel estimate in terms of time based on the output from the channel estimating unit 102. The Doppler frequency estimating unit 104 estimates a Doppler frequency based on the phase variation amount.

In the Doppler frequency detector shown in FIG. 1, the pilot signal received from the mobile station is supplied to the channel estimating unit 102. The pilot signal is supplied from a demodulating unit (not shown). The channel estimating unit 102 calculates a channel estimate $h(m)$ through a processing expressed by Formula (1). The channel estimate $h(m)$ is a complex number containing information on a phase and a reception intensity of the channel.

$$h(m) = (1/K) \cdot \Sigma z_c(m,k) D^*(k) \quad k=1, K \quad (1)$$

where $z_c$ is a demodulated pilot signal, $D^*$ is a conjugate complex number of a known pilot signal, $K$ is the number of pilot symbols in a slot of the pilot signal, $k$ is a pilot symbol number and $m$ is a slot number of a time slot of the pilot signal. According to Formula (1), the received pilot signal $z_c$ is multiplied by the conjugate complex number $D^*$ of the known pilot signal $D$. The numbers obtained by the multiplication are averaged in the slot. The channel estimates of the respective pilot symbols are averaged by the pilot symbol number $K$.

The channel estimating unit 102 normalizes the channel estimate $h(m)$, and supplies the normalized channel estimate $(h(m)/|h(m)|)$ to the inner product value calculating unit 103. In this case, $|h(m)|$ is an absolute value of $h(m)$. The inner product value calculating unit 103 calculates the phase variation amount $\theta$ by the following Formula (2).

$$\theta = \cos^{-1}[Re\{h'(m) \cdot h'(m-n)^*\}] \quad (2)$$

where
$h'(m) = h(m)/|h(m)|$, and
$h'(m-n) = h(m-n)/|h(m-n)|$.

In this case, $Re\{x\}$ is a real part of the complex number $x$, and $n$ is a calculation interval for obtaining the phase variation amount $\theta$. The Formula (2) produces the same result as that of a processing in which the normalized complex numbers $h'(m)$ and $h'(m-n)$ are regarded as two-dimensional vectors and an angle formed between the two-dimensional vectors is obtained from an inner product value of the two-dimensional vectors. Therefore, hereinafter, "n" is also referred to as "inner product value calculation interval".

To be specific, the inner product value calculating unit 103 calculates the phase variation amount $\theta$ from the channel estimate $h(m)$ with the slot number $m$ and the channel estimate $h(m-n)$ with the slot number which is $n$ slots antecedent to the slot number $m$. The phase variation amount $\theta$ can also be obtained by calculating an argument of $h(m)/h(m-n)$.

The Doppler frequency estimating unit 104 estimates a Doppler frequency of the received signal based on the obtained phase variation amount $\theta$.

Figure 2:
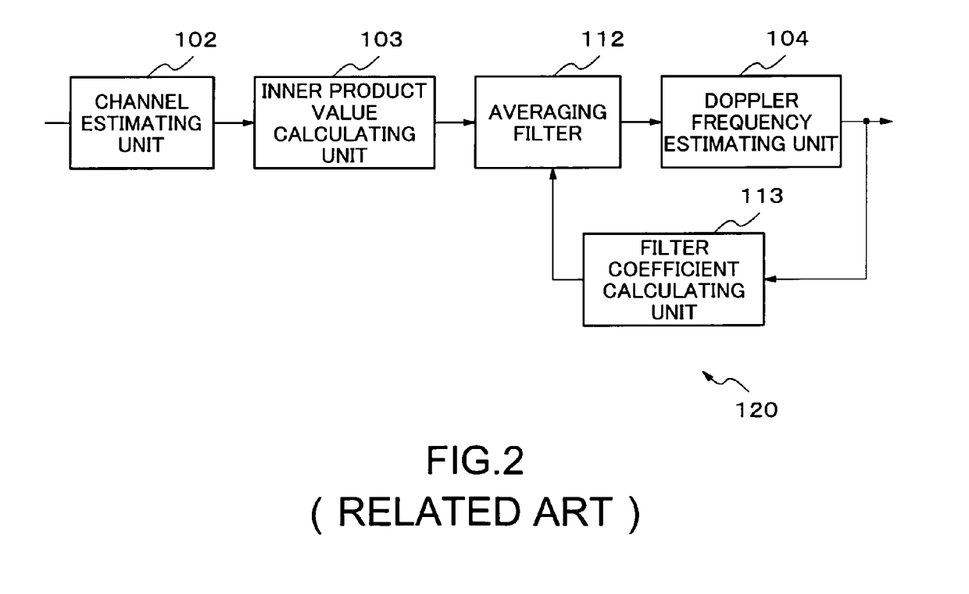
FIG. 2 is a block diagram for explaining a second related art of the present invention.

FIG. 2 is a block diagram for explaining the outline of a technique described in JP 2001-24727 A (hereinafter, referred to as Document 3). According to this technique, a filter coefficient of an averaging filter for averaging the amounts of phase variation is controlled based on a Doppler frequency estimate.

A Doppler frequency detector shown in FIG. 2 includes the channel estimating unit 102, the inner product value calculating unit 103 and the Doppler frequency estimating unit 104 of FIG. 1. The Doppler frequency detector further includes an averaging filter 112 and a filter coefficient calculating unit 113. The averaging filter 112 averages the amounts of phase variation calculated by the inner product value calculating unit 103. The averaging filter 112 is formed of, for example, an Infinite-duration Impulse Response (IIR) filter. The filter coefficient calculating unit 113 controls filter coefficients of the averaging filter 112 based on the Doppler frequency estimate obtained by the Doppler frequency estimating unit 104.

The filter coefficient calculating unit 113 of FIG. 2 calculates the filter coefficient by using the Doppler frequency estimated by the Doppler frequency estimating unit 104 and a forgetting factor.

JP 2004-15819 A (hereinafter, referred to as Document 4) discloses a method of calculating an inner product value of pilot symbols and changing a filter coefficient for averaging the inner product value in accordance with the calculated inner product value to thereby determine a fading frequency based on the averaged inner product value. Document 4 also discloses that a base station calculates the inner products for a plurality of calculation intervals in parallel.

With the method of FIG. 1, however, the inner product calculation interval (n) for calculating the inner product is constant regardless of the Doppler frequency of the received signal. Therefore, when the Doppler frequency of the received signal is low, the resolution for detecting the phase variation amount becomes insufficient, which leads to lower the estimation accuracy of the Doppler frequency. On the other hand, when the Doppler frequency of the received signal is high, the calculation interval (n) becomes longer with respect to the estimated Doppler frequency, which also lowers the estimation accuracy of the Doppler frequency.

In the method described in Document 3, when the Doppler frequency is high, a time interval during which the averaging is performed becomes shorter. Therefore, a satisfactory effect cannot be obtained from the averaging.

Document 4 describes that, as stated above, the base station calculates a plurality of inner products for the plurality of calculation intervals, respectively. Therefore, the technique described in Document 4 requires a large amount of calculation. Moreover, in the technique described in Document 4, in a case where, for example, the fading frequency is high, the calculation of inner products at large calculation intervals serves for nothing. The wasteful calculation disadvantageously increases the device size of the base station.

SUMMARY OF THE INVENTION

The first exemplary feature of the invention provides a Doppler frequency estimating technique for estimating a Doppler frequency with high accuracy and a small amount of calculation.

According to the first exemplary aspect of the invention, there is provided a Doppler frequency detector for detecting a Doppler frequency of a received signal. The detector includes a channel estimating unit, a channel phase variation amount calculating unit, a Doppler frequency estimating unit and a calculation interval calculating unit. The channel estimating unit calculates a channel estimate based on a pilot signal in the received signal. The channel phase variation amount calculating unit calculates channel phase variation amount based on the channel estimate and a calculation interval. The Doppler frequency estimating unit estimates the Doppler frequency based on the channel phase variation amount and outputs a Doppler frequency estimate. The calculation interval calculating unit calculates the calculation interval based on the Doppler frequency estimate and supplies the calculated calculation interval to the channel phase variation amount calculating unit.

According to this aspect, a channel is estimated for a received pilot signal, and the channel phase variation amount is calculated based on the channel estimate and a calculation interval, to thereby estimate a Doppler frequency for a mobile station based on the phase variation amount of the channel. Furthermore, according to this aspect, the calculation interval for which the phase variation amount is calculated is obtained based on the estimated Doppler frequency. To be specific, according to this aspect, the calculation interval (n) for which the channel phase variation amount is calculated is successively updated based on the Doppler frequency estimate. Therefore, in this aspect, the Doppler frequency is estimated with high accuracy, requiring a small amount of calculation.

The other features and other aspects of the present invention will be apparent from the following description of the preferred embodiments.

BRIEF DESCRIPTION OF THE DRAWINGS

The above and other objects, features and advantages of the present invention will become apparent from the following detailed description when taken with the accompanying drawings in which.

DETAILED DESCRIPTION OF THE PREFERRED EMBODIMENTS

Hereinafter, preferred embodiments of the present invention will be described with reference to the accompanying drawings.

Figure 3:
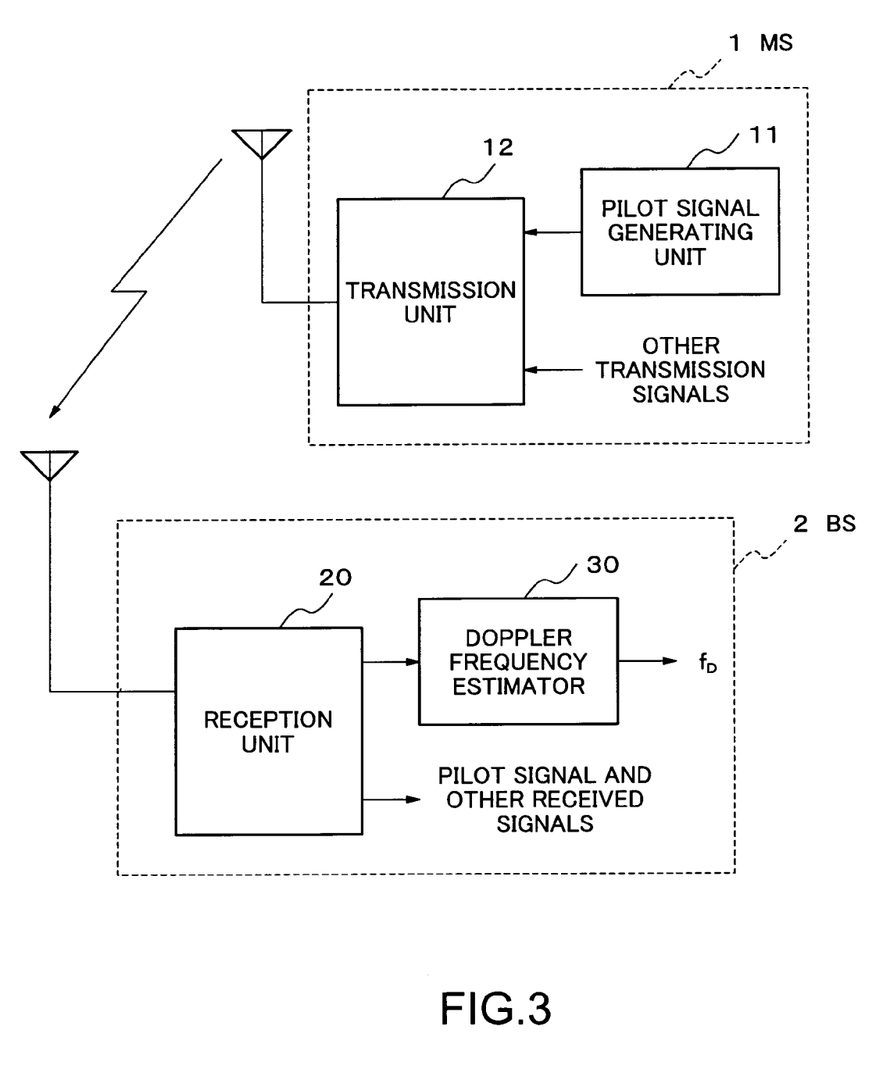
FIG. 3 is a view showing an example of a mobile communication system where the present invention may be used.

FIG. 3 is a view showing an example of a mobile communication system to which the present invention is applied.

As illustrated in FIG. 3, in the mobile communication system, a mobile station (MS) 1 and a base station (BS) 2 can be connected to each other over a wireless connection. In FIG. 3, the illustration of internal components of the mobile station 1 and the base station 2, which are not directly related to the present invention, is omitted.

The mobile station 1 includes a pilot signal generating unit 11 and a transmission unit 12. The pilot signal generating unit 11 generates a pilot signal to be transmitted to the base station 2. The transmission unit 12 transmits the pilot signal with the other transmitted signals to the base station 2.

The base station 2 includes a reception unit 20 and a Doppler frequency estimator 30. The reception unit 20 supplies the pilot signal from the signals received from the mobile station 1 to the Doppler frequency estimator 30. The Doppler frequency estimator 30 outputs a Doppler frequency estimate (fD) of the received signal based on the pilot signal. The reception unit 20 also supplies the pilot signal and the other received signals to each unit (not shown) in the base station 2.

First Exemplary Embodiment

Figure 4:
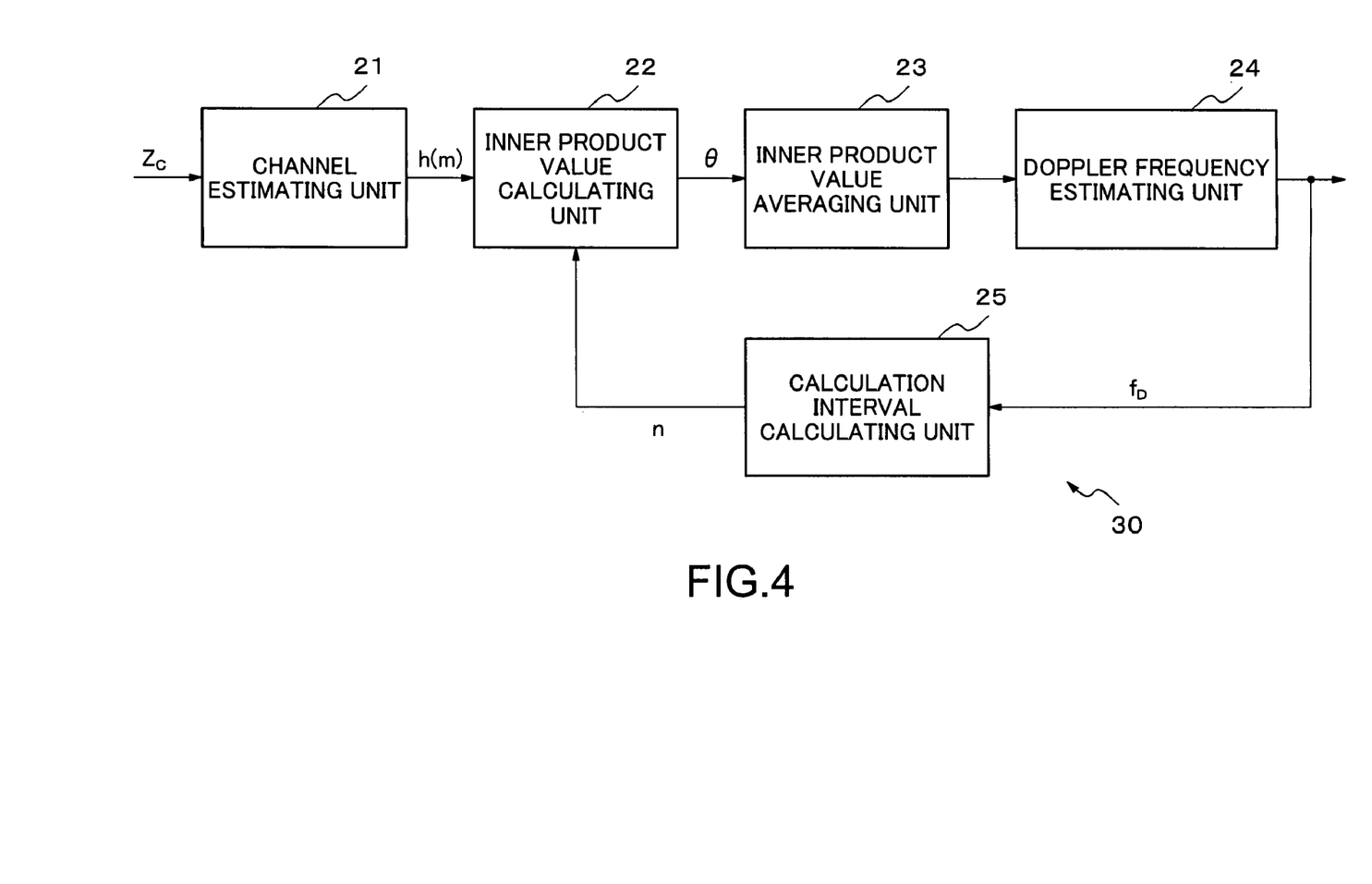
FIG. 4 is a block diagram showing a first exemplary embodiment of the present invention.

FIG. 4 is a block diagram showing a first exemplary embodiment of the Doppler frequency estimator 30 shown in FIG. 3.

The Doppler frequency estimator according to the first exemplary embodiment consists of a channel estimating unit 21, an inner product value calculating unit 22; an inner product value averaging unit 23, a Doppler frequency estimating unit 24 and an inner product calculation interval calculating unit 25.

The channel estimating unit 21 estimates a channel based on the received pilot signal to output a channel estimate (h(m)). The inner product value calculating unit 22 calculates a channel phase variation amount (θ) based on the channel estimate from the channel estimating unit 21 at a calculation interval (n) supplied from the inner product calculation interval calculating unit 25.

The inner product value averaging unit 23 averages the channel phase variation amounts within a predetermined period of time.

The Doppler frequency estimating unit 24 estimates a Doppler frequency of the received signal based on the average phase variation amount to output the estimate (fD) The inner product calculation interval calculating unit 25 calculates a calculation interval of the inner product value based on the Doppler frequency estimate to supply the result of calculation (n) to the inner product value calculating unit 22.

The installation of the inner product value averaging unit 23 may be omitted. The same is applied to the other exemplary embodiments to be described later.

Hereinafter, a Doppler frequency estimating method in the first exemplary embodiment having the configuration as described above will be explained.

Figure 5:
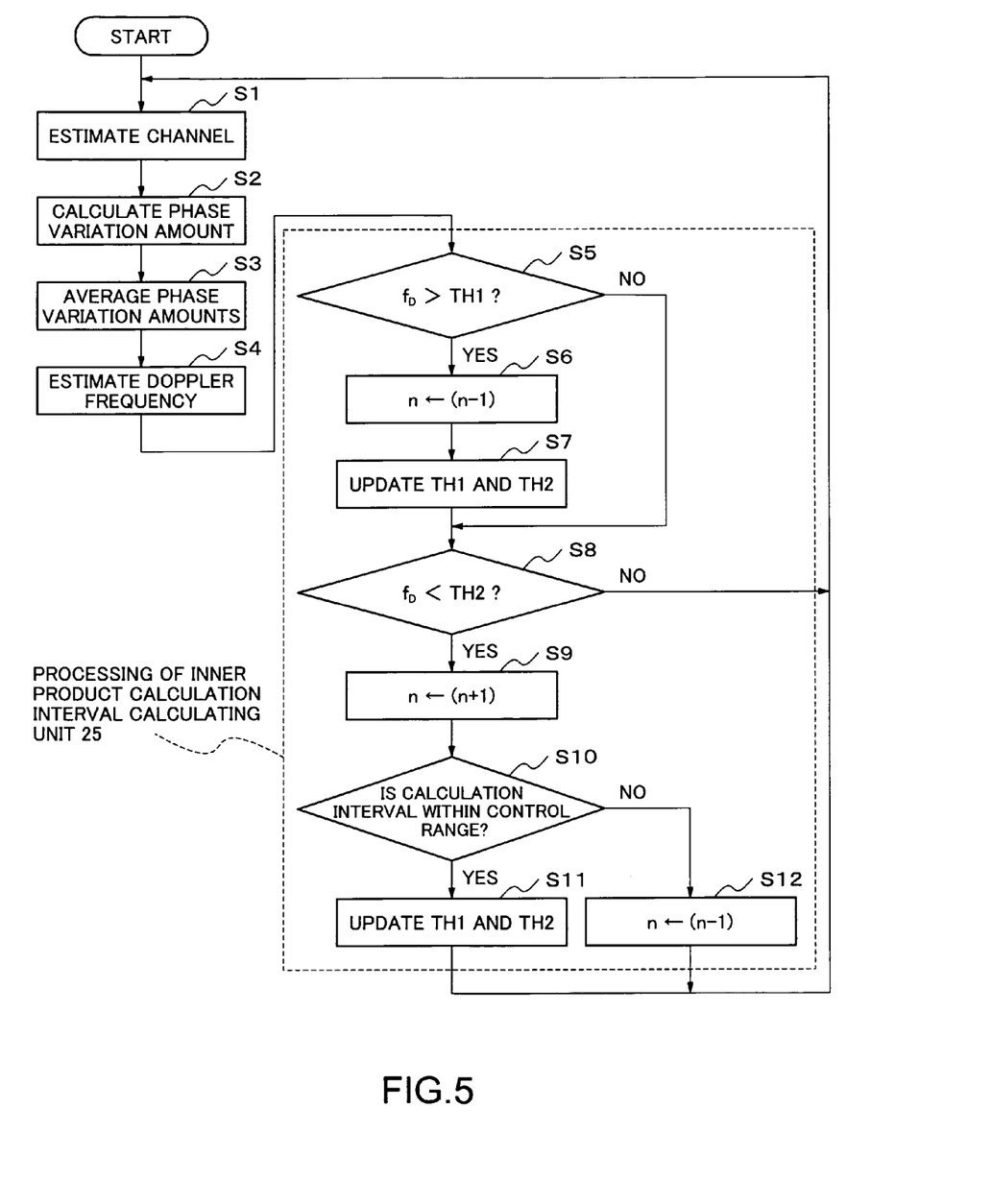
FIG. 5 is a flowchart for explaining an operation of the first exemplary embodiment.

FIG. 5 is a flowchart for explaining an estimation method with the Doppler frequency estimator shown in FIG. 4. An area surrounded with a broken line of FIG. 5 represents a processing performed in the inner product calculation interval calculating unit 25 which characterizes this first exemplary embodiment.

First, the pilot signal transmitted from the mobile station 1 to be received by the base station 2 is supplied to the channel estimating unit 21.

Then, in Step S1, the channel estimating unit 21 calculates the channel estimate (h(m)) based on the received pilot signal to supply the calculated channel estimate to the inner product value calculating unit 22. Since an example of the specific channel estimating method has already been described above in BACKGROUND OF THE INVENTION, the same description thereof is herein omitted.

In Step S2, the inner product value calculating unit 22 calculates the channel phase variation amount θ from the channel estimate. In this step, the inner product value calculating unit 22 calculates the phase variation amount θ at the calculation interval (n) designated by the inner product calculation interval calculating unit 25. The calculation is performed, for example, in accordance with Formula (2). An initial value of the calculation interval n is a predefined value. The initial value is set at the time when, for example, the base station registers the mobile station to be connected thereto.

In Step S3, the inner product value averaging unit 23 averages the phase variation amounts supplied from the inner product value calculating unit 22 over a predetermined period of time. In the averaging processing, a moving average may also be used. The averaged phase variation amount is supplied to the Doppler frequency estimating unit 24.

In Step S4, the Doppler frequency estimating unit 24 estimates a Doppler frequency based on the averaged phase variation amount. The Doppler frequency estimate (fD) is supplied to the inner product calculation interval calculating unit 25. Since a specific estimation method of the Doppler frequency based on the phase variation amount is well known to the skilled persons in the art, the detailed description thereof is herein omitted.

In Step S5, the inner product calculation interval calculating unit 25 judges whether or not the Doppler frequency estimate (fD) is larger than a first threshold value (TH1).

When the Doppler frequency estimate is larger than the first threshold value, the inner product calculation interval calculating unit 25 judges that the inner product is required to be calculated at a smaller calculation interval. Then, the inner product calculation interval calculating unit 25 reduces the current value of the inner product calculation interval by one slot. More specifically, when the current value of the inner product calculation interval is n, the inner product calculation interval calculating unit 25 updates the inner product calculation interval to (n−1). Next, in Step S7, the inner product calculation interval calculating unit 25 updates the first threshold value and a second threshold value to values in accordance with the updated inner product calculation interval. The second threshold value (TH2) will be described below. The update of the threshold values is performed by, for example, the following formulae.

$$TH1\text{new} = (n\text{old}/n\text{new})TH1\text{old}$$

$$TH2\text{new} = (n\text{old}/n\text{new})TH2\text{old}$$

where nold and nnew are a calculation interval before update and a calculation interval after update, respectively; TH1 old and TH1 new are the first threshold value before update and the first threshold value after update, respectively; and TH2 old and TH2 new are the second threshold value before update and the second threshold value after update, respectively. In the present invention, the threshold values TH1 and TH2 may also be fixed values without updating the threshold values as described above.

On the other hand, when it is judged that the Doppler frequency is not larger than TH1, the inner product calculation interval calculating unit 25 omits the processings of Steps S6 and S7.

In Step S8, the inner product calculation interval calculating unit 25 judges whether or not the Doppler frequency estimate (fD) is smaller than the second threshold value (TH2). Here, $TH1 \geq TH2$.

When the Doppler frequency estimate (fD) is smaller than the second threshold value, the inner product calculation interval calculating unit 25 judges that the inner product is required to be calculated at a larger calculation interval. Then, in Step S9, the inner product calculation interval calculating unit 25 increases the inner product calculation interval by one slot. More specifically, when the current value of the inner product calculation interval is n, the inner product calculation interval calculating unit 25 updates the inner product calculation interval to (n+1). When the Doppler frequency estimate is not smaller than the second threshold value TH2, the processing of the base station returns to Step S1.

The inner product calculation interval calculating unit 25 sets an upper limit for the inner product calculation interval to prevent divergence in a closed loop shown in FIG. 5. In Step S10, the inner product calculation interval calculating unit 25 judges whether or not the inner product calculation interval updated in Step S9 is equal to or smaller than the upper limit.

When the result of judgment in Step S10 is "Yes", the inner product calculation interval calculating unit 25 updates the first and second threshold values to values corresponding to the updated calculation interval in Step S11. After that, the processing of the base station returns to Step S1.

On the other hand, when the result of judgment in Step S11 is "No", the inner product calculation interval calculating unit 25 reduces the inner product calculation interval, which has been increased by one slot in Step S9, by one slot (Step S12). Namely, the inner product calculation interval calculating unit 25 cancels the result of update of the inner product calculation interval in Step S9. Then, the processing of the base station returns to Step S1.

Then, the value of the inner product calculation interval calculated by the processing of Steps S5 through S12 is supplied from the inner product calculation interval calculating unit 25 to the inner product value calculating unit 22.

Figure 6:
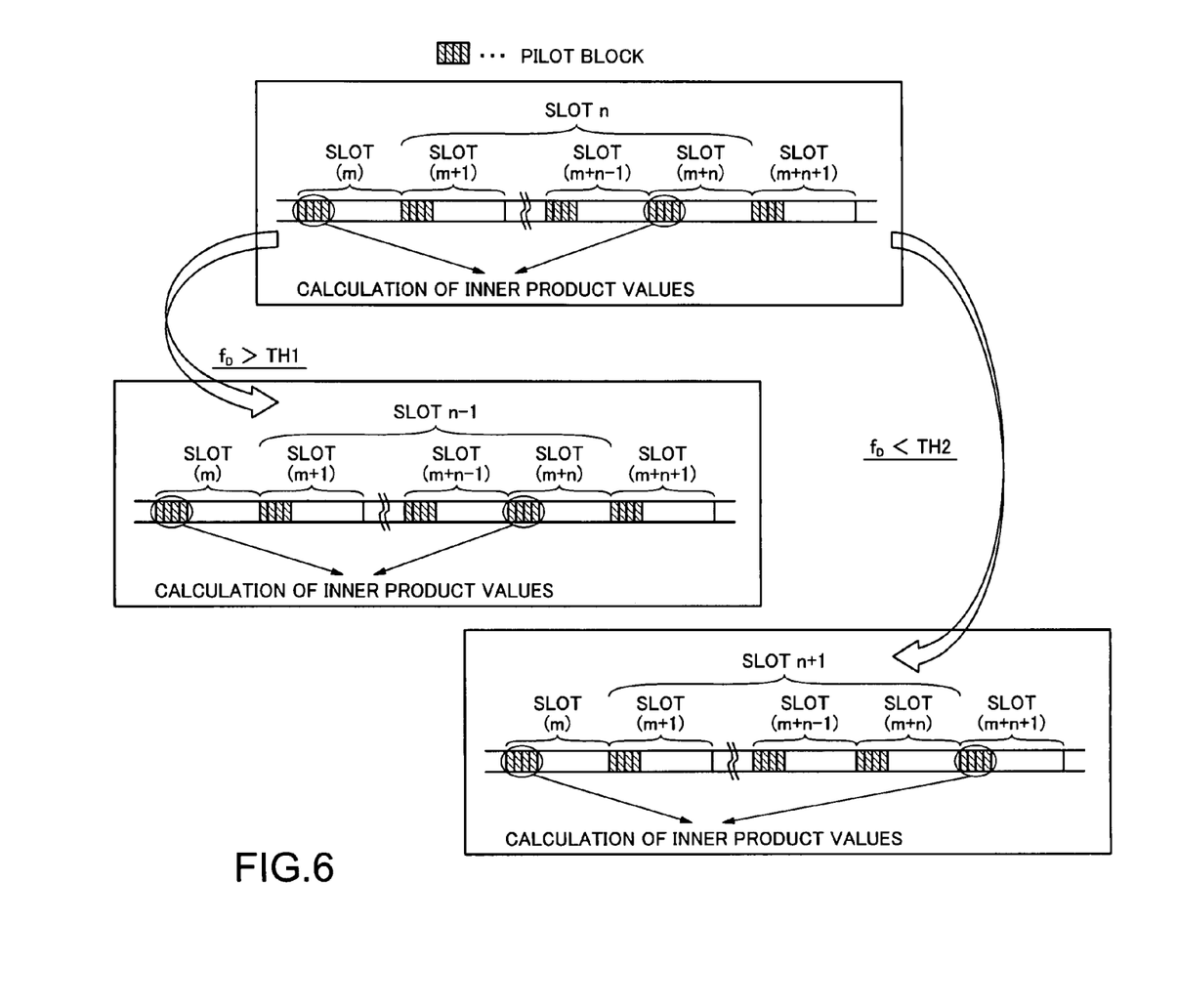
FIG. 6 is a view showing an image of a processing for changing a calculation interval.

FIG. 6 is a view showing an image of the processing of Steps S6 and S9 described in FIG. 5.

As shown in FIG. 6, a pilot block is provided for each time slot in the pilot signal. Each pilot block contains a pilot symbol group. In the initial state, the inner product calculation interval is set to n. In this state, a slot (m) and a slot (m+n) are to be calculated for the inner product.

After that, if the estimated Doppler frequency fD is larger than TH1, the inner product calculation interval calculating unit 25 reduces the inner product calculation interval by one slot. Therefore, the slot (m) and a slot (m+n−1) are now to be calculated for the inner product.

If the estimated Doppler frequency is smaller than TH2, the inner product calculation interval calculating unit 25 increases the inner product calculation interval by one slot. Therefore, the slot (m) and a slot (m+n+1) are now to be calculated for the inner product.

Second Exemplary Embodiment

Next, a second exemplary embodiment of the present invention will be described. In the second exemplary embodiment, the Doppler frequency estimator forcibly updates the inner product calculation interval at the time when the Doppler frequency suddenly varies.

Figure 7:
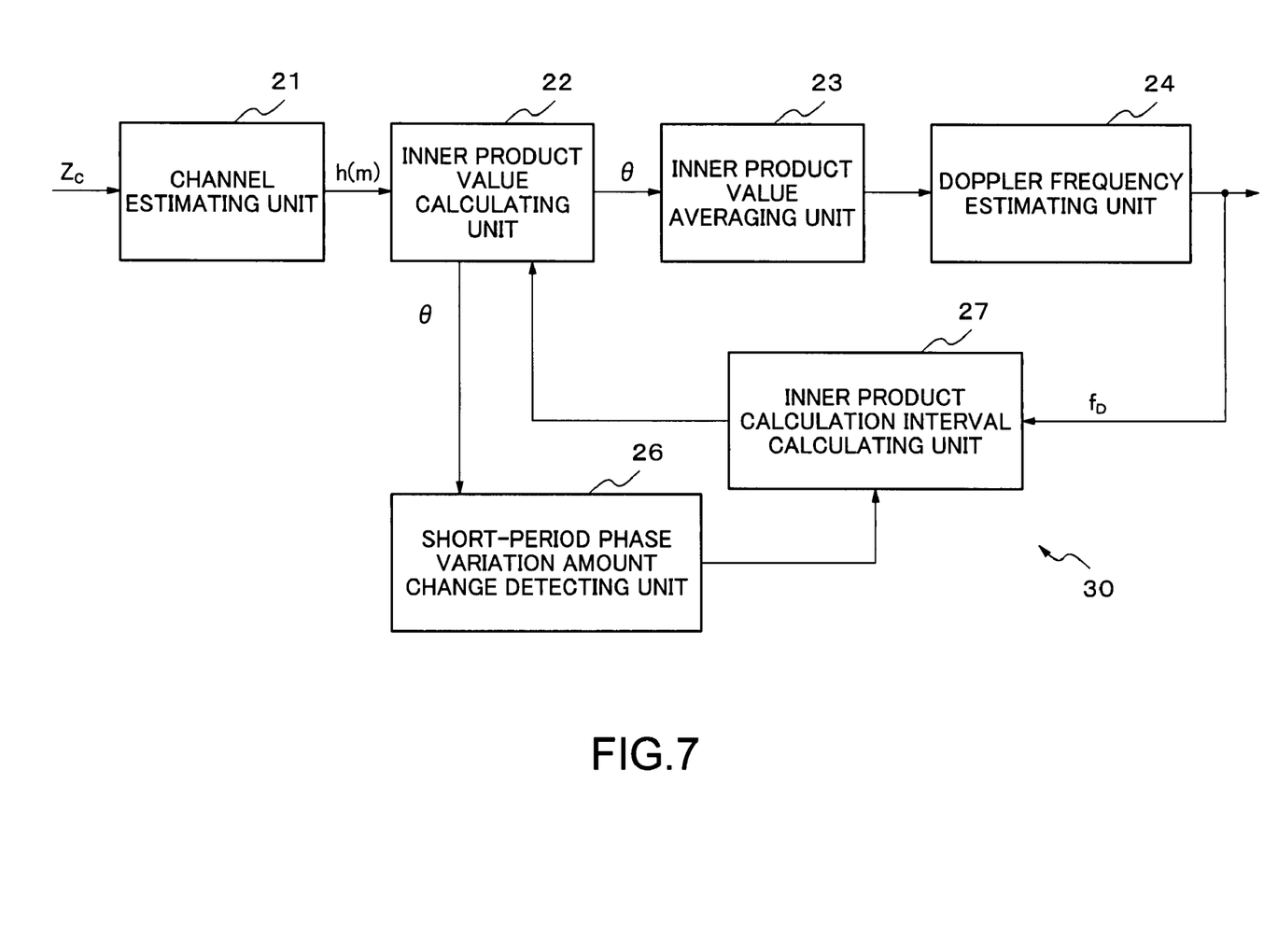
FIG. 7 is a block diagram showing a second exemplary embodiment of the present invention.

FIG. 7 is a block diagram showing the second exemplary embodiment of the base station according to the present invention.

In the second exemplary embodiment, a short-period phase variation amount change detecting unit 26 is further provided in addition to the configuration of the first exemplary embodiment shown in FIG. 4. Further, in the second exemplary embodiment, the inner product calculation interval calculating unit 25 shown in FIG. 3 is replaced by an inner product calculation interval calculating unit 27.

The short-period phase variation amount change detecting unit 26 judges whether or not a change in the phase variation amount θ calculated by the inner product value calculating unit 22 is large over a short period. If the change in the phase variation amount θ is large, the short-period phase variation amount change detecting unit 26 instructs the inner product calculation interval calculating unit 27 to make the calculation interval shorter than a current value.

Hereinafter, a processing in the short-period phase variation amount change detecting unit 26 and the inner product calculation interval calculating unit 27 included in the base station 3 configured as described above will be described with reference to FIG. 8.

Figure 8:
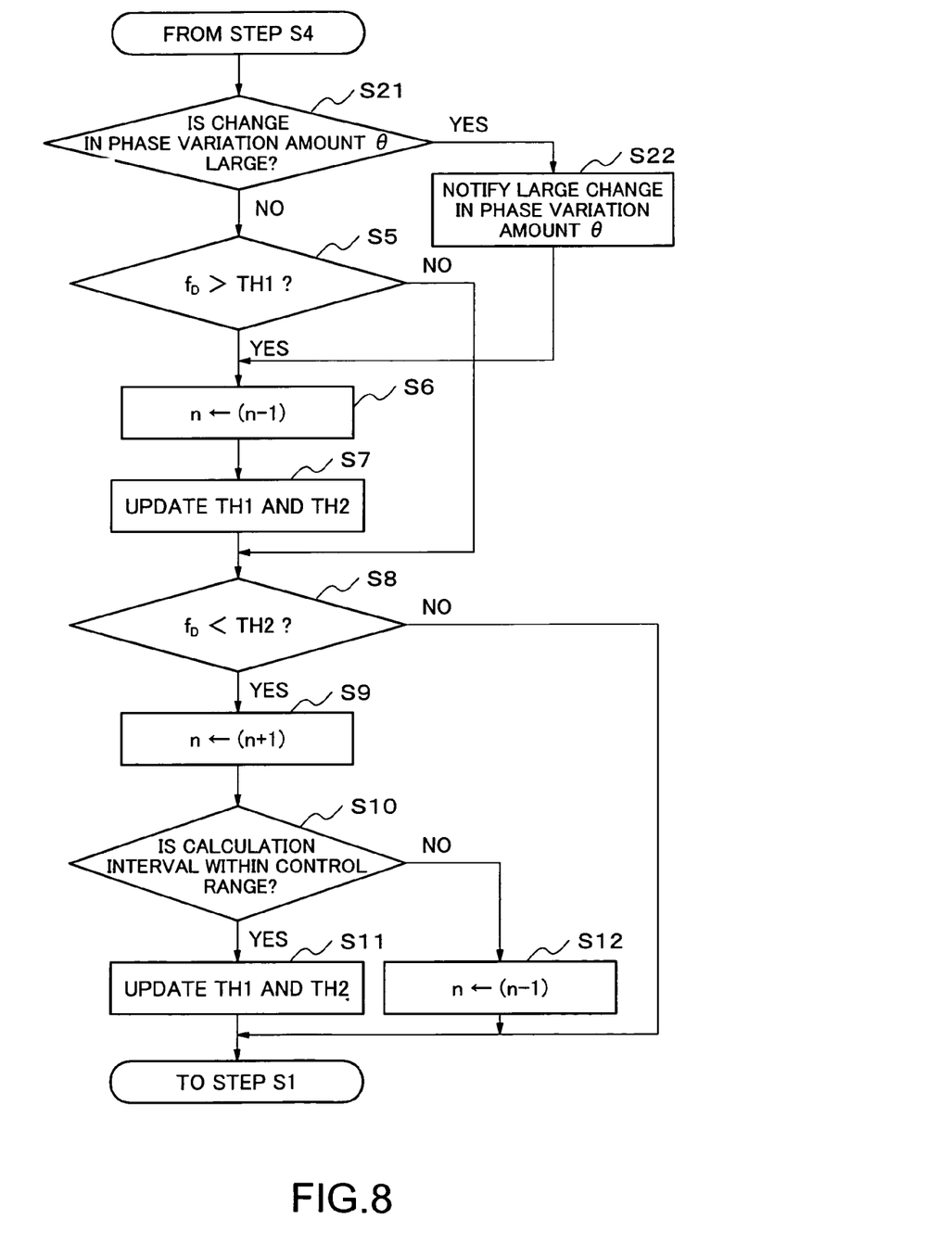
FIG. 8 is a flowchart for explaining an operation of the second exemplary embodiment.

FIG. 8 is a flowchart for explaining the processing in the short-period phase variation amount change detecting unit 26 and the inner product calculation interval calculating unit 27 shown in FIG. 7. Therefore, in FIG. 8, Steps S1 to S4 shown in FIG. 5 are omitted.

In the second exemplary embodiment, the processing of Steps S5 through S12 shown in FIG. 8 is the same as that of Steps S5 through S12 shown in FIG. 5. The processing shown in FIG. 8 differs from that shown in FIG. 5 in that Steps S21 and S22 are provided. Therefore, the same description for Steps S5 through S12 is herein omitted.

In Step S21, the short-period phase variation amount change detecting unit 26 judges whether or not the change in the phase variation amount θ supplied from the inner product value calculating unit 22 is larger than a predetermined third threshold value. When the result of judgment is "Yes", the short-period phase variation amount change detecting unit 26 notifies the inner product calculation interval calculating unit 27 of the occurrence of a sudden change in the phase variation amount θ (Step S22). In response to the notification, the inner product calculation interval calculating unit 27 starts the processing from Step S6.

Then, the inner product calculation interval calculating unit 27 supplies the value of the inner product calculation interval calculated by the processing shown in FIG. 8 to the inner product value calculating unit 22. After that, the inner product value calculating unit 22 calculates the phase variation amount based on the inner product calculation interval.

Third Exemplary Embodiment

Next, a third exemplary embodiment of the present invention will be described. In the third exemplary embodiment, the inner product calculation intervals are averaged over a predetermined period. At the averaged inner product calculation interval, the inner product is calculated.

Figure 9:
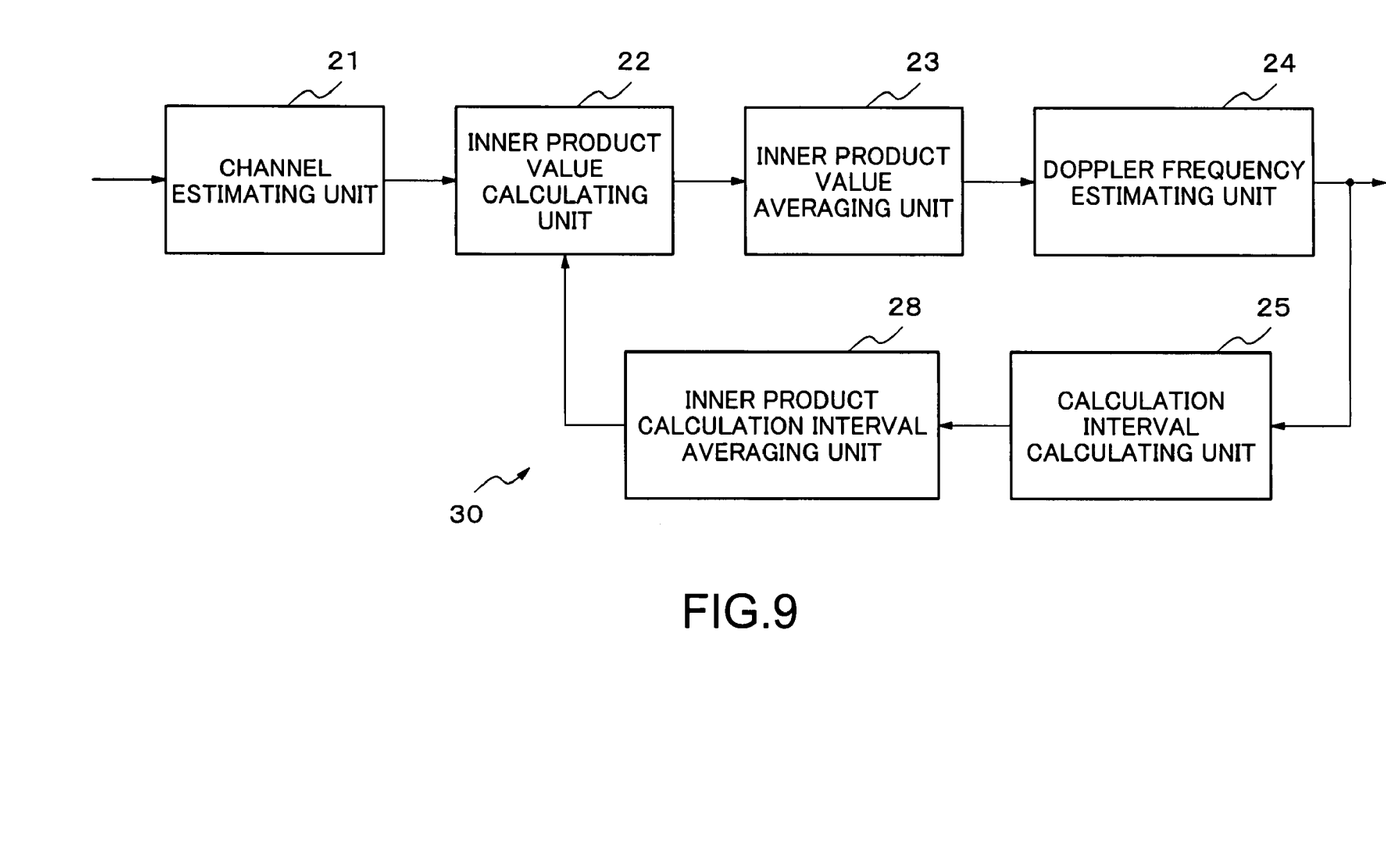
FIG. 9 is a block diagram showing a third exemplary embodiment of the present invention.

FIG. 9 is a block diagram showing the third exemplary embodiment of the Doppler frequency estimator according to the present invention.

As shown in FIG. 9, in the third exemplary embodiment, an inner product calculation interval averaging unit 28 is provided in addition to the configuration of the first exemplary embodiment shown in FIG. 4. The inner product calculation interval averaging unit 28 averages the inner product calculation intervals calculated by the inner product calculation interval calculating unit 25 over a predetermined period.

As described in the first exemplary embodiment, the inner product calculation interval calculating unit 25 calculates the inner product calculation interval based on the Doppler frequency estimated by the Doppler frequency estimating unit 24.

Upon supply of the calculated inner product calculation intervals from the inner product calculation interval calculating unit 25, the inner product calculation interval averaging unit 28 averages the calculated inner product calculation intervals over a given period of time. The inner product calculation interval averaging unit 28 supplies the averaged inner product calculation interval to the inner product calculation unit 22. The inner product value calculating unit 22 calculates the phase variation amount θ based on the averaged inner product calculation interval as described above.

It is apparent that the third exemplary embodiment may be modified, for example, to add the function of the short-period phase variation amount change detecting unit 26 which is described in the second exemplary embodiment. In addition to the above-modification, the short-period phase variation amount change detecting unit 26 may be further modified to stop the averaging operation of the inner product calculation interval averaging unit 28 shown in FIG. 9 when the phase variation amount θ changes in a short period of time.

In the three exemplary embodiments described above, the phase variation amount θ is calculated by using the inner product of the channel estimates h(m) and h(m−n) as expressed by Formula (2). According to the present invention, the phase variation amount θ can also be obtained by calculating the argument of h(m)/h(m−n).

Also, it is easy for the skilled persons in the art to prestore a program prepared based on the flowchart exemplified in FIG. 5 or 8 in a non-transitory machine-readable storage medium. The program allows a computer to execute the Doppler frequency estimating method according to the present invention.

While this invention has been described in connection with certain exemplary embodiments, it is to be understood that the subject matter encompassed by way of this invention is not be limited to those specific embodiments. On the contrary, it is intended for the subject matter of the invention to include all alternatives, modifications and equivalents as can be included with the sprit and scope of the following claims. Further; the inventor's intent is to retain all equivalents even if the claims are amended during prosecution.

What is claimed is:

1. A Doppler frequency detector which detects a Doppler frequency of a received signal, comprising:
   a channel estimating unit which calculates a channel estimate based on a pilot signal in the received signal;
   a channel phase variation amount calculating unit which calculates a channel phase variation amount based on said channel estimate and a calculation interval;
   a Doppler frequency estimating unit which estimates said Doppler frequency based on said channel phase variation amount and outputs a Doppler frequency estimate; and
   a calculation interval calculating unit which calculates said calculation interval based on said Doppler frequency estimate and supplies it to said channel phase variation amount calculating unit,
   wherein said calculation interval calculating unit updates said calculation interval to be smaller than a current value when said Doppler frequency estimate is larger than a first threshold value (TH1), and updates said calculation interval to be larger than said current value when said Doppler frequency estimate is smaller than a second threshold value (TH2; TH2≦TH1).

2. The Doppler frequency detector according to claim 1, wherein said calculation interval calculating unit updates said first threshold value and said second threshold value in accordance with a degree of update of said calculation interval, when said calculation interval is updated.

3. The Doppler frequency detector according to claim 1, wherein said channel phase variation amount calculating unit calculates the channel phase variation amount based on an inner product of the channel estimate at a current time and the channel estimate at a time antecedent to the current time by the amount of time corresponding to the calculation interval.

4. The Doppler frequency detector according to claim 1, wherein said channel phase variation amount calculating unit calculates said channel phase variation amount based on said channel estimate at a current time and said channel estimate at a time antecedent to the current time by the amount of time corresponding to said calculation interval.

5. The Doppler frequency detector according to claim 1, further comprising a channel phase variation amount averaging unit which averages said channel phase variation amounts in a predetermined period of time to supply said averaged channel phase variation amount to said Doppler frequency estimating unit.

6. The Doppler frequency detector according to claim 1, further comprising a short-period channel phase variation amount detecting unit which generates a channel phase variation amount short-period change notification to notify said calculation interval calculating unit of the generated channel phase variation amount short-period change notification, when detecting a change in said channel phase variation amount within a short period of time, wherein said calculation interval calculating unit further has a function of reducing said calculation interval to be smaller than a current value upon reception of said channel phase variation amount short-period change notification.

7. The Doppler frequency detector according to claim 1, further comprising a calculation interval averaging unit which receives said calculation interval from said calculation interval calculating unit and averages said received calculation intervals in a predetermined period of time to supply said averaged calculation interval to said channel phase variation amount calculating unit, wherein said channel phase variation amount calculating unit calculates said channel phase variation amount based on said averaged calculation interval instead of said calculation interval.

8. The Doppler frequency detector according to claim 7, further comprising a short-period channel phase variation amount detecting unit which generates a channel phase variation amount short-period change notification to notify said calculation interval averaging unit of said generated channel phase variation amount short-period change notification, when detecting a change of said channel phase variation amount within a short period of time, wherein said calculation interval averaging unit further has a function of supplying said calculation interval as it is to said channel phase variation amount calculating unit upon reception of said channel phase variation amount short-period change notification.

9. A Doppler frequency detecting method which detects a Doppler frequency of a received signal, comprising:
   calculating a channel estimate based on a pilot signal in the received signal;
   calculating a channel phase variation amount based on said channel estimate and a calculation interval;
   estimating said Doppler frequency based on said channel phase variation amount and outputting a Doppler frequency estimate; and
   calculating said calculation interval based on said Doppler frequency estimate,
   wherein said calculating said calculation interval updates said calculation interval to be smaller than a current value when said Doppler frequency estimate is larger than a first threshold value (TH1) and updates said calculation interval to be larger than said current value when said Doppler frequency estimate is smaller than a second threshold value (TH2; TH2≦TH1).

10. The Doppler frequency detecting method according to claim 9, wherein said calculating said calculation interval further updates said first threshold value and said second threshold value in accordance with a degree of update of said calculation interval, when said calculation interval is updated.

11. The Doppler frequency detecting method according to claim 9, wherein said calculating a channel phase variation amount calculates said channel phase variation amount based on an inner product of said channel estimate at a current time and said channel estimate at a time antecedent to said current time by the amount of time corresponding to said calculation interval.

12. The Doppler frequency detecting method according to claim 9, wherein said calculating a channel phase variation amount calculates said channel phase variation amount based on said channel estimate at a current time and said channel estimate at a time antecedent to said current time by the amount of time corresponding to said calculation interval.

13. The Doppler frequency detecting method according to claim 9, further comprising averaging said channel phase variation amounts in a predetermined period of time, wherein said estimating said Doppler frequency estimates said Doppler frequency based on said averaged channel phase variation amount rather than on said channel phase variation amount.

14. The Doppler frequency detecting method according to claim 9, further comprising:
generating a channel phase variation amount short-period change notification when detecting a change in said channel phase variation amount within a short period of time, wherein said calculating said calculation interval further comprises reducing said calculation interval to be smaller than a current value upon reception of said channel phase variation amount short-period change notification.

15. A Doppler frequency detecting method according to claim 9, further comprising:
receiving said calculation interval generated in said calculating said calculation interval, averaging said calculation intervals in a predetermined period of time to calculate and outputting said averaged calculation interval, wherein said calculating a channel phase variation amount calculates said channel phase variation amount based on said averaged calculation interval rather than on said calculation interval.

16. The Doppler frequency detecting method according to claim 15, further comprising:
generating a channel phase variation amount short-period change notification, when detecting a change in said channel phase variation amount within a short period of time, wherein said receiving said calculation interval outputs said calculation interval as it is upon reception of said channel phase variation amount short-period change notification.

17. A non-transitory machine-readable storage medium recorded with a program for allowing a computer to execute a Doppler frequency detecting method for detecting a Doppler frequency of a received signal, the program comprising:
calculating a channel estimate based on a pilot signal in said received signal;
calculating a channel phase variation amount based on said channel estimate and a calculation interval;
estimating said Doppler frequency based on said channel phase variation amount to output a Doppler frequency estimate; and
calculating said calculation interval based on said Doppler frequency estimate,
wherein said calculating said calculation interval updates said calculation interval to be smaller than a current value when said Doppler frequency estimate is larger than a first threshold value (TH1) and updates said calculation interval to be larger than said current value when aid Doppler frequency estimate is smaller than a second threshold value (TH2; TH2≦TH1).

18. The recording storage medium according to claim 17, wherein said calculating said calculation interval further updates said first threshold value and said second threshold value in accordance with a degree of update of said calculation interval, when said calculation interval is updated.

19. The storage medium according to claim 17, wherein said calculating a channel phase variation amount calculates said channel phase variation amount based on an inner product of said channel estimate at a current time and said channel estimate at a time antecedent to said current time by the amount of time corresponding to said calculation interval.

20. The storage medium according to claim 17, wherein said calculating a channel phase variation amount calculates said channel phase variation amount based on said channel estimate at a current time and said channel estimate at a time antecedent to the current time by the amount of time corresponding to said calculation interval.

21. A storage medium detector according to claim 17,
wherein the program further comprises:
said channel phase variation amounts in a predetermined period of time,
wherein said estimating said Doppler frequency estimates said Doppler frequency based on said averaged channel phase variation amount rather than on said channel phase variation amount.

22. A storage medium detector according to claim 17,
wherein the program further comprises:
generating a channel phase variation amount short-period change notification when detecting
a change in said channel phase variation amount within a short period of time,
and wherein said calculating said calculation interval reduces said calculation interval to be smaller than a current value upon reception of said channel phase variation amount short-period change notification.

23. A storage medium according to claim 17,
wherein the program further comprises:
receiving said calculation interval generated in said calculating said calculation interval and averaging said calculation intervals in a predetermined period of time to calculate and output said averaged calculation interval,
and wherein said calculating a channel phase variation amount calculates said channel phase variation amount based on said averaged calculation interval rather than on said calculation interval.

24. A storage medium according to claim 23,
wherein said program further comprises generating a channel phase variation amount short-period change notification when detecting a change in said channel phase variation amount within a short period of time at time,
wherein said receiving said calculation interval outputs said calculation interval as it is upon reception of said channel phase variation amount upon reception of said channel phase variation amount short-period change notification.

* * * * *